United States Patent [19]

Karabin et al.

[11] Patent Number: 4,812,215
[45] Date of Patent: Mar. 14, 1989

[54] LOW TEMPERATURE CURABLE AQUEOUS ELECTRODEPOSITABLE COATING COMPOSITIONS

[75] Inventors: Richard F. Karabin, Ruffs Dale; Ken W. Niederst; Michael G. Sandala, both of Allison Park; Edward R. Coleridge, Lower Burrell, all of Pa.

[73] Assignee: PPG Industries, Inc., Pittsburgh, Pa.

[21] Appl. No.: 231,335

[22] Filed: Aug. 12, 1988

Related U.S. Application Data

[63] Continuation-in-part of Ser. No. 947,292, Dec. 29, 1986, abandoned.

[51] Int. Cl.$^4$ .......................... C08L 63/00; C25B 13/06
[52] U.S. Cl. .................................. 204/181.7; 523/410; 523/411; 523/414; 523/416; 523/424; 524/510; 524/514; 524/555; 524/901
[58] Field of Search ............... 524/901, 510, 514, 555; 523/410, 411, 414, 416, 424; 204/181.7

[56] References Cited

U.S. PATENT DOCUMENTS

| | | | |
|---|---|---|---|
| 3,793,278 | 2/1974 | De Bona | 260/29.2 |
| 3,839,252 | 10/1974 | Bosso et al. | 260/29.2 |
| 3,873,488 | 3/1975 | Gibbs et al. | 260/29.7 H |
| 3,882,188 | 5/1975 | Behmel | 260/850 |
| 3,894,922 | 9/1975 | Bosso et al. | 204/181 |
| 3,935,087 | 1/1976 | Jerabeck et al. | 204/181 |
| 3,937,679 | 2/1976 | Bosso et al. | 260/29.3 |
| 3,959,106 | 5/1976 | Bosso et al. | 204/181 |
| 4,002,586 | 1/1977 | Wessling et al. | 260/29.2 EP |
| 4,020,030 | 4/1977 | Harris et al. | 260/29.2 |
| 4,038,232 | 9/1977 | Bosso et al. | 260/29.6 |
| 4,066,525 | 1/1978 | Woo et al. | 204/181 |
| 4,097,352 | 1/1978 | Bosso et al. | 204/181 |
| 4,119,599 | 10/1978 | Woo et al. | 260/29.4 R |
| 4,159,233 | 6/1979 | Ting et al. | 204/181 |
| 4,218,296 | 8/1980 | Gilchrist | 204/181 |
| 4,229,335 | 10/1980 | Ting et al. | 260/29.4 R |
| 4,379,911 | 4/1983 | Parekh et al. | 528/245 |
| 4,383,073 | 5/1983 | Wessling et al. | 525/486 |
| 4,454,274 | 6/1984 | Singer et al. | 524/157 |
| 4,469,832 | 9/1984 | Singer et al. | 524/160 |
| 4,477,618 | 10/1984 | Singer et al. | 524/157 |
| 4,500,680 | 2/1985 | Singer et al. | 525/143 |
| 4,501,833 | 2/1985 | Bosso | 523/416 |
| 4,501,854 | 2/1985 | Singer et al. | 525/162 |

FOREIGN PATENT DOCUMENTS 2236910 2/1974 European Pat. Off. .
1413054 11/1975 United Kingdom .

OTHER PUBLICATIONS

Calbo, Leonard J., "Effect of Catalyst Crosslinked with Hexa(methoxymethyl)melamine", *Journal of Coatings Technology* (reprint).

Chattha, Bauer, "Latent Acid Catalysts for Hydroxy-/Melamine Coatings", Ind. Eng. Chem. Prod. Res. Dev., vol. 22, No. 3, 1983, pp. 440–444.

Handbook of Chemistry & Physics, 39th ed, pp. 496–497, Chemical Rubber Pub. Co., Cleveland OH. 1958.

*Primary Examiner*—C. Warren Ivy
*Attorney, Agent, or Firm*—Linda Pingitore

[57] ABSTRACT

An aqueous, cationically electrodepositable coating composition contains a ternary sulfonium or quaternary phosphonium group containing resin, an aminoplast or phenoplast crosslinking agent and a catalytic amount of a non-ionic ester of a sulfonic acid as latent acid catalyst to catalyze the reaction between the sulfonium or phosphonium group containing resin and the aminoplast crosslinking agent.

21 Claims, No Drawings

LOW TEMPERATURE CURABLE AQUEOUS ELECTRODEPOSITABLE COATING COMPOSITIONS

CROSS REFERENCE TO RELATED APPLICATIONS

This application is a continuation-in-part of Ser. No. 947,292, filed Dec. 29, 1986, now abandoned.

BACKGROUND OF THE INVENTION

The present invention relates to aqueous, cationically electrodepositable coating compositions.

Heretofore, it has been difficult to formulate aqueous, acid catalyzed, cationically electrodepositable coating compositions which can cure at low temperatures and when cured exhibit good physical properties without yellowing. A portion of the difficulty resides in the fact that since the acid catalyst is water soluble it migrates to the anode in the electrodeposition bath instead of remaining dissolved in the resin micelles where it can deposit with the coating film and catalyze the cure of the film. Since the amount of catalyst present in the film is diminished, the degree of cure is lessened and the ultimate cured film properties are detrimentally affected. In addition, the nitrogen base containing resins degrade to form amines which have a tendency to produce yellowing of the cured film upon baking or aging. This yellowing effect makes it difficult to formulate coating compositions in white and pastel colors.

There is a need, therefore, for a low temperature curable, aqueous, cationically electrodepositable coating composition which exhibits good physical properties when cured and does not exhibit yellowing.

SUMMARY OF THE INVENTION

In accordance with the present invention there is provided an aqueous, cationically electrodepositable coating composition, comprising a ternary sulfonium or quaternary phosphonium group containing resin, an aminoplast or phenoplast crosslinking agent and a catalytic amount of a non-ionic ester of a sulfonic acid as latent acid catalyst to catalyze the reaction between the sulfonium or phosphonium group containing resin and the aminoplast or phenoplast crosslinking agent.

Also provided is a method of electrocoating an electrically conductive surface serving as a cathode, comprising passing an electric current between said cathode and an anode in electrical contact with an aqueous electrodepositable coating composition comprising a ternary sulfonium or quaternary phosphonium group containing resin, an aminoplast or phenoplast crosslinking agent and a catalytic amount of a non-ionic ester of a sulfonic acid as latent acid catalyst to catalyze and the reaction between the sulfonium or phosphonium group containing resin and the aminoplast or phenoplast crosslinking agent.

DETAILED DESCRIPTION OF THE INVENTION

The aqueous, cationically electrodepositable coating compositions of the present invention comprise a ternary sulfonium or quaternary phosphonium group containing resin; an aminoplast or phenoplast crosslinking agent and a catalytic amount of a non-ionic ester of a sulfonic acid as latent acid catalyst to catalyze the reaction between the sulfonium or phosphonium group containing resin and the aminoplast or phenoplast crosslinking agent. It should be understood that the resinous component of the claimed coating composition is essentially free of basic nitrogen containing groups.

Quaternary phosphonium group-containing resins can be prepared by reacting an epoxy compound with a phosphine in the presence of an acid to form quaternary phosphonium base group-containing resins.

The epoxy compound can be any monomeric or polymeric compound or mixture of compounds having a 1,2-epoxy equivalency of greater than one, that is, the average number of 1,2-epoxy groups per molecule is greater than one. It is preferred that the epoxy compound is a polyepoxide, i.e., contains more than one epoxy group per molecule, and contains free hydroxyl groups.

A useful class of polyepoxides is the polyglycidyl ethers of polyphenols, such as Bisphenol A. These may be produced, for example by etherfication of a polyphenol with epichlorohydrin or dichlorohydrin in the presence of an alkali. The phenolic compound may be bis(4-hydroxyphenyl)2,2-propane, 4,4'-dihydroxybenzophenone,
bis(4-hydroxyphenyl)1,1-isobutane,
bis(4-hydroxytertiarybutylphenyl)-2,2-propane,
bis(2-hydroxynaphthyl)methane, 1,5-hydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycreol, bis(4-hydroxycyclohexol)2,2-propane, and the like.

Another class of polyepoxides are those containing oxyalkylene groups in the epoxy molecule. Such oxyalkylene groups are typically groups of the general formula:

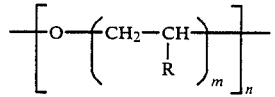

where R is hydrogen or alkyl, preferably lower alkyl (e.g., having 1 to 6 carbon atoms) and where, in most instances, m is 1 to 4 and n is 2 to 50. Such groups can be pendant to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about one percent by weight or more, and preferably 5 percent or more of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides. Other monohydric alcohols can be used, for example, the commercially-available materials known as Cellosolves and Carbitols, which are monoalkyl ethers of polyalkylene glycols. The reaction of the monohydric alcohol and the polyepoxide is generally carried out in the presence of a catalyst. Formic acid, dimethylethanolamine, diethylethanolamine, N,N-dimethylbenzylamine and, in some cases, stannous chloride are useful for this purpose.

Similar polyepxides containing oxyalkylene groups can be produced by oxyalkyating the epoxy resin by other means, such as by direct reaction with an alkylene oxide.

The polyepoxide employed to produce the foregoing epoxies containing oxyalkylene groups contain a sufficient number of epoxy groups so that the average number of residual epoxy groups per molecule remaining in the product after the oxyalkylation is greater than 1.0. These epoxides, which tend to contain unreacted alcohols or hydroxyl-containing byproducts, are less preferred unless purified to remove interfering hydroxyl containing materials.

One preferred class of resins which may be employed is acrylic polymers containing epoxy groups. Hydroxyl groups can be present. Preferably these acrylic polymers are polymers formed by copolymerizing an unsaturated epoxy-containing monomer, such as, for example, glycidyl acrylate or methacrylate and at least one other unsaturated monomer.

Any polymerizable monomeric compound containing at least one

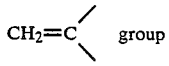 group preferably in terminal position, may be polymerized with the unsaturated glycidyl compounds. Examples of such monomers include aromatic compounds such as phenyl compounds, for example, styrene, alpha-methylstyrene, vinyl toluene and the like. Also aliphatic compounds such as N-alkoxyacrylamides or methacrylamides, e.g. n-butoxy methacrylamide, olefinic acids and esters such as acrylic acid, methyl acrylate ethyl acrylate, methyl methacrylate and the like.

One especially preferred class of the aforesaid acrylic polymers containing epoxy groups are interpolymers of an unsaturated epoxy group containing monomer and an N-alkoxymethyl substituted unsaturated carboxylic acid amide. The epoxy group containing monomer contains a

group and is capable of being polymerized with the carboxylic acid amide. The interpolymers are characterized by having amido hydrogen atoms replaced by the structure —RCHOR$_1$, wherein R is selected from the group consisting of hydrogen and saturated lower aliphatic hydrocarbon radicals and R$_1$ is a member of the class consisting of hydrogen and lower alkyl radicals. In general, these interpolymers can be produced in two ways. In the first method, the unsaturated carboxylic acid amide chosen is an N-alkoxymethyl acrylamide (i.e., a material having an —NHRCHOR$_1$ group in the molecule). This N-alkoxymethyl acrylamide is then polymerized with the other monomer having a

group to produce a useful interpolymer. Typically other unsaturated monomers are also included. In the second method, an unsaturated carboxylic acid amide, e.g., acrylamide is polymerized with the other monomer having a

group and is then reacted with an aldehyde to form a useful interpolymer. Again, other unsaturated monomers are typically included. Examples of the other monomers have been listed above.

Examples of useful interpolymers and their method of manufacture are disclosed in U.S. Pat. Nos. 2,978,437; 3,037,963 and 3,079,434.

The aforedescribed interpolymers are capable of crosslinking without the necessity of adding external crosslinking agent. Although external crosslinking agent is not necessary, satisfactory results are attainable if external crosslinking agent is also added.

In carrying out the polymerization reaction, techniques well known in the art may be employed. A peroxide type catalyst is ordinarily utilized; diazo compounds or redox catalyst systems can also be employed as catalysts.

If one desires to prepare a resin containing hydroxyl groups this can be accomplished by incorporating a hydroxyl containing unsaturated monomer. Preferred hydroxyl containing unsaturated monomers include hydroxyalkyl acrylates and methacrylates, for example, hydroxyethyl acrylate or methacrylate, and hydroxypropyl acrylate or methacrylate.

Another method of producing acrylic polymers which may be utilized in this invention is to react an acrylic polymer containing reactive sites, such as hydroxyl groups, with an epoxy-containing compound such as the diglycidyl ether of Bisphenol A or other polyepoxides as enumerated elsewhere herein, to provide an epoxy group-containing acrylic polymer.

The phosphine employed may be virtually any phosphine which does not contain interfering groups. For example, the phosphine may be aliphatic, aromatic or alicyclic. Examples of such phosphines include lower trialkyl phosphine, such as trimethyl phosphine, triethyl phosphine, tripropyl phosphine, tributyl phosphine, mixed lower alkyl phenyl phosphines, such as phenyl dimethyl phosphine, phenyl diethyl phosphine, phenyl dipropyl phosphine, diphenyl methyl phosphine, diphenyl ethyl phosphine, diphenyl propyl phosphine, triphenyl phosphine, alicyclic phosphines such as tetramethylene methyl phosphine and the like.

The acid employed may be virtually any acid which forms a quaternary phosphonium salt. Preferably the acid is an organic carboxylic acid. Examples of the acids which may be employed are boric acid, lactic acid, formic acid, acetic acid, propionic acid, butyric acid, hydrochloric acid, phosphoric acid, and sulfuric acid. Preferably the acid is an acid having a dissociation constant greater than about $1 \times 10^{-5}$.

The ratio of phosphine to acid is not unduly critical. Since one mole of acid is utilized to form one mole of phosphonium group, it is preferred that at least about one mole of acid by present for each mole of desired phosphine-to-phosphonium conversion.

The phosphine/acid mixture and the epoxy compound are reacted by mixing the components, sometimes at moderately elevated temperatures. The reaction temperature is not critical and is chosen depending upon the reactants and their rates. Frequently the reaction proceeds well at room temperature or temperatures up to 70° C., if desired. In some cases, temperatures as high as about 110° C. or higher may be employed. A solvent is not necessary, although one is often used in order to afford better control of the reaction. Aromatic hydrocarbons, monoalkyl ethers of ethylene glycol, and aliphatic alcohols are suitable solvents. The proportions of the phosphine and the epoxy compound can be varied and the optimum proportions depend upon the particular reactants. Ordinarily, however, from about one part to about 50 parts by weight of the phosphine per 100 parts of epoxy compound is employed. The proportions are usually chosen with reference to the amouunt of phosphine which is typically from about 0.1 to about 35 percent, based on the total weight of the phosphine and the epoxy compound.

Ternary sulfonium group-containing resins can be prepared by reacting an epoxy compound with a sulfide in the presence of an acid to form ternary sulfonium base group-containing resins.

The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include dialkyl sulfides such as diethyl sulfide, dipropyl sulfide, dibutyl sulfide, dihexyl sulfide, phenyl sulfide or alkyl phenyl sulfides such as diphenyl sulfide, ethyl phenyl sulfide, alicyclic sulfides, such as tetramethylene sulfide, pentamethylene sulfide, hydroxyl alkyl sulfides such as thiodiethanol, thiodipropanol, thiodibutanol and the like.

The acid employed may be virtually any acid which forms a ternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid and sulfuric acid. Preferably, the acid is an acid having a dissociation constant greater than about $1 \times 10^{-5}$.

The ratio of sulfide to acid is not unduly critical. Since one mole of acid is utilized to form one mole of sulfonium group, it is preferred that at least about one mole of acid be present for each mole of desired sulfide-to-sulfonium conversion.

The sulfide/acid mixture and the epoxy compound are reacted by mixing the components, usually at moderately elevated temperatures such as 50° C. to 110° C. A solvent is not necessary, although one is often used in order to afford better control of the reaction. Aromatic hydrocarbons, monoalkyl ethers of ethylene glycol and aliphatic alcohols are suitable solvents. The proportions of the sulfide to the epoxy compound can be varied and the optimum proportions depend upon the particular reactants. Ordinarily, however, from about one part to about 50 parts by weight of the sulfide per 100 parts of epoxy compound is employed. The proportions are usually chosen with reference to the amount of sulfur, which is typically from about 0.1 to about 35 percent, based on the total weight of the sulfide and the epoxy compound.

Since the sulfide and phosphine react with the epoxy group, where epoxy group-containing products are desired, less than an equivalent of sulfide or phosphine should be employed so that the resultant resin has one epoxy group per average molecule.

The particular reactants, proportions and reaction conditions should be chosen in accordance with considerations well-known in the art, so as to avoid gelation of the product during the reaction. For example, excessively severe reaction conditions should not be employed. Similarly, compounds having reactive substituents should not be utilized along with epoxy compounds with which those substituents might react adversely at the desired conditions.

The crosslinking agent can be an aminoplast or phenoplast resin however the aminoplast resins are preferred. Aminoplast resins are based on the addition products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivates of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5 triazine, and the like.

While the aldehyde employed is most often formaldehyde, other similar condensation products can be made from other aldehydes, such as acetaldehyde, crotonaldehyde, acrolein, benazldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. The preferred aminoplast resins are substantially alkylated with methanol or butanol.

The phenolic resins which may be used as crosslinking agents herein are formed by the condensation of an aldehyde and a phenol. The most used aldehyde is formaldehyde, although other aldehydes, such as acetaldehyde, can also be employed. Methylene-releasing and aldehyde-releasing agents such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenyls containing a butenyl group in ortho, meta or para position, and where the double bond occurs in various positions in the hydrocarbon chain. A common phenolic resin is phenol formaldehyde.

As has been discussed previously in the specification, the crosslinking agent can be present internally as part of the sulfonium or phosphonium group containing resin. This has been discussed in detail above therefore additional explanation will not be given here.

In one preferred embodiment of the present invention wherein the crosslinking agent is present internally as part of the sulfonium or phosphonium group containing resin the amount of the material providing both sulfonium or phosphonium group containing resin and crosslinking agent ranges from about 90 percent by weight to about 99.9 percent by weight, preferably 97 percent by weight to about 99.5 percent by weight, the percentages based on the total weight of the combination sulfonium or phosphonium group containing resin/crosslinking agent and catalyst in the composition. The amount of catalyst can vary from about 0.1 percent by weight to about 10 percent by weight, preferably about 0.5 percent to about 3 percent.

When the sulfonium or phosphonium group containing resin, crosslinking agent and catalyst are three separate materials, the amount of sulfonium or phosphonium group containing resin which is present in the coating composition ranges from about 40 percent by weight to about 95 percent by weight, preferably from about 60 percent by weight to about 90 percent by weight and the amount of crosslinking agent ranges from about 5 percent by weight to about 60 percent by weight, preferably about 10 percent by weight to about 40 percent by weight, the percentages based on the total weight of the sulfonium or phosphonium group containing resin and crosslinking agent. The amount of catalyst can vary from about 0.1 percent by weight to about 10 percent by weight, preferably about 0.5 percent to about 3 percent by weight, the percentages based on the total weight of the composition.

In one embodiment of the present invention the catalyst is a free acid catalyst such as dodecylbenzenesulfonic acid, dinonylnaphthalene sulfonic acid or disulfonic acid.

In another embodiment the catalyst is non-ionic and more preferably the catalyst is a non-ionic latent acid catalyst.

A latent acid catalyst is one in which the free acid groups are blocked with a blocking agent. During cure the catalysts are activated by heating which results in liberation of the free acid catalyst. One particularly useful class of latent acid catalysts are non-ionic esters of sulfonic acids. Examples of suitable latent acid catalysts are those disclosed in U.S. Pat. Nos. 4,454,274; 4,469,832; 4,477,618; 4,500,680 and 4,501,854 all to Singer et al. The disclosure of each of these patents is incorporated by reference herein.

One particularly preferred group of latent acid catalysts are those of U.S. Pat. No. 4,454,274 represented by either of the following structural formulas:

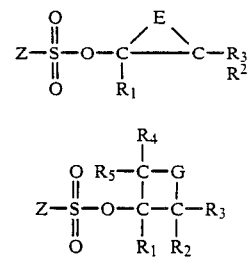

wherein:

Z is a radical selected from the group consisting of amino and an organic radical, said organic radical being connected to the sulfur atom by a carbon atom;

E is $C_1$–$C_{18}$ alkylene, $C_2$–$C_{18}$ alkenylene;

G is $C_1$–$C_{18}$ alkylene, $C_1$–$C_{18}$ hydroxyl substituted alkylene, $C_2$–$C_{18}$ alkenylene, $C_2$–$C_{18}$ hydroxyl substituted alkenylene;

and $R_1$, $R_2$, $R_3$, $R_4$ and $R_5$ are independently hydrogen or organic radical.

One particularly preferred catalyst of this group is cyclohexyl tosylate.

Another preferred group of catalysts are those of U.S. Pat. No. 4,477,618 which are represented by the following structural formula:

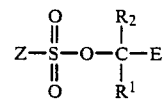

wherein:

Z is a radical selected from the group consisting of amino and an organic radical, said organic radical being connected to the sulfur atom by a carbon atom;

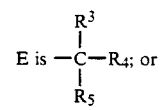

$C_3$–$C_{20}$ cycloalkyl; and $R_1$ is hydrogen, carboalkoxy, $C_3$–$C_{20}$ alkyl, $C_6$–$C_{18}$ aryl, or $C_3$–$C_{20}$ cycloalkyl;

$R_2$ is hydrogen, carboalkoxy, $C_3$–$C_{20}$ alkyl, $C_6$–$C_{18}$ aryl, or $C_3$–$C_{20}$ cycloalkyl;

$R_3$ is hydrogen, carboalkoxy, acyloxy, N-alkylcarbamyloxy, N-arylcarbamyloxy, $C_3$–$C_{20}$ alkyl, $C_6$–$C_{18}$ aryl, or $C_3$–$C_{20}$ cycloalkyl;

$R_4$ is hydrogen, carboalkoxy, acyloxy, N-alkylcarbamyloxy, N-arylcarbamyloxy, $C_3$–$C_{20}$ alkyl, $C_6$–$C_{18}$ aryl, or $C_3$–$C_{20}$ cycloalkyl; and $R_5$ is hydrogen, carboalkoxy, acyloxy, N-alkylcarbamyloxy, N-arylcarbamyloxy, $C_3$–$C_{20}$ alkyl, $C_6$–$C_{18}$ aryl, or $C_3$–$C_{20}$ cycloalkyl;

One particularly preferred catalyst of this group 2,2,4-trimethyl-1,3-pentanediyl dimethanesulfonate.

Another preferred group of catalysts are the non-ionic, saturated or unsaturated organic polycyclic esters of U.S. Pat. No. 4,469,832.

One particularly preferred group of latent acid catalysts are those esters which are formed by reacting an oxirane containing material, preferably having at least two oxirane groups per molecule, with a sulfonic acid. The resultant ester will contain a beta hydroxyl group which is prone to hydrolyze readily. Therefore, the hydroxyl group which forms can be protected by reacting it with, for example, a monoisocyanate. One particularly useful catalyst is that which is formed by reacting a cycloaliphatic polyepoxide such as 3,4-epoxycyclohexylmethyl 3,4-epoxyhexane carboxylate (ERL 4221 which is commercially availble from Union Carbide) and a sulfonic acid such as para-toluenesulfonic acid. The beta-hydroxyl group which forms can be protected by reacting it with for example, phenyl isocyanate.

The catalyst is generally present in the claimed coating compositions in an amount ranging from about 0.1 percent by weight to about 10 percent by weight, preferably from about 0.5 to about 3 percent by weight, the percentages being based on the total weight of the composition.

The concentration of the resinous components of the coating composition in water depends upon the process parameters to be used and is, in general, not critical. Ordinarily, the major proportion of the aqueous composition is water, e.g., the composition can contain from about 5 to about 25 percent by weight of resinous components.

In most instances, a pigment composition and, if desired, various additives such as surface-active agents, coupling solvents, and the like known in the electrodeposition are are included. The pigment composition may be of any conventional type comprising, for example, one or more pigments such as iron oxides, lead oxides, strontium chromate, carbon black, titanium dioxide, talc, barium sulfate, cadmium yellow, cadmium red, chromic yellow, coal dust, and the like. It should be understood that pigments of a basic nature are not preferred because they can detrimentally affect cure of the coating composition.

The present invention is also directed to a method of electrocoating an electrically conductive surface serving as a cathode comprising passing an electric current between said cathode and an anode in electrical with an aqueous, electrodepositable coating composition comprising a ternary sulfonium or quaternary phosphonium group containing resin, an aminoplast or phenoplast crosslinking agent and a catalytic amount of a non-ionic ester of a sulfonic acid as latent acid catalyst the reaction between the sulfonium or phosphonium group containing resin and the aminoplast or phenoplast crosslinking agent.

In the electrodeposition process employing the aqueous coating compositions described above the aqueous composition is placed in contact with an electrically-conductive anode and an electrically-conductive cathode, with the surface to be coated being the cathode. Upon passage of electric current between the anode and the cathode, while in contact with the bath containing composition, an adherent film of the coating composition is deposited on the cathode.

The conditions under which the electrodeposition is carried out are in general similar to those used in electrodeposition of other types of coatings. The applied voltage may be varied greatly and can be, for example, as low as one volt or as high as several thousand volts. The current density is usually between about 1.0 ampere and 15 amperes per square foot and tends to decrease during electrodeposition.

The method of the invention is applicable to the coating of any electrically-conductive substrate, and especially metal such as steel, aluminum, copper, and the like.

After deposition, the coating is cured at elevated temperatures by any convenient method, such as in baking ovens or with banks of infrared heat lamps. Curing temperatures can vary but are usually preferably from about 350° F. (177° C.) to 425° F. (218° C.), although curing temperatures from about 250° F. (121° C.) to 500° F. (260° C.) or even 600° F. (316° C.) may be employed, if desired.

The following examples are only illustrative of the invention and are not intended to limit it to their details.

EXAMPLE I

In this example two coating compositions were prepared utilizing an acrylic derived sulfonium group containing resin having internal crosslinking moieties, with catalyst and without catalyst. The cured coating compositions were evaluated for physical properties.

| Part A Coating Composition Without Catalyst | |
|---|---|
| Ingredients | Parts by Weight (grams) |
| acrylic sulfonium group containing resin[1] | 1221.8 |
| grind paste[2] | 248.86 |
| deionized water | 1029.34 |

[1]The acrylic derived sulfonium group containing resin having internal crosslinking moieties was prepared in the following manner:

| Ingredients | Parts by Weight (grams) |
|---|---|
| ethylene glycol monohexyl ether | 199.4 |
| ethylene glycol monobutyl ether | 49.8 |
| deionized water | 276.8 |
| styrene | 185.0 |
| 2-ethylhexyl acrylate | 185.0 |
| methyl methacrylate | 370.0 |
| N—butoxymethylol acrylamide | 243.9 |
| glycidyl methacrylate | 110.0 |
| tertiary dodecyl mercaptan | 15.0 |
| VAZO 67[a] | 30.0 |
| thiodiethanol | 179.1 |
| lactic acid | 60.0 |

[a]This free radical initiator is 2,2'-azobis-(2-methylbutyronitrile) and it is commercially available from E. I. DuPont de Nemours Company The acrylic derived sulfonium group containing resin was prepared by adding the vinyl monomers to a suitably equipped reactor vessel in the presence of the free radical initiator over a three hour period, while maintaining the temperature at about 116° C. Subsequently the mixture of monohexyl ether, monobutyl ether and mercaptan was added in two equal portions. Then 100 parts of the deionized water were added and the mixture stripped in vacuo. Subsequently, the thiodiethanol, lactic acid and the remaining deionized water were added. The resultant acrylic derived sulfonium group containing resin had a weight average molecular weight of 11,846.

[2]The grind paste was prepared in the following manner:

| Ingredients | Parts by Weight (grams) |
|---|---|
| grind vehicle[b] | 3103.73 |
| deionized water | 321.70 |
| lampblack pigment | 21.96 |
| phtalocyanine green pigment | 31.60 |
| red iron oxide pigment | 35.90 |
| yellow iron oxide pigment | 358.56 |
| Imsil A 108[c] | 829.80 |
| R-900 titanium dioxide[d] | 5251.15 |

[b]The grind vehicle was prepared in the following manner:

| Charge | Ingredients | Parts by Weight (grams) |
|---|---|---|
| I | EPON 828[i] | 3617.0 |
| II | bisphenol A | 1584.5 |
| III | ethyltriphenylphosphonium iodide | 5.2 |

Part A
Coating Composition Without Catalyst

| | | |
|---|---|---|
| IV | PROPASOL B[ii] | 1642.3 |
| V | SURFYNOL 104[iii] | 131.4 |
| VI | thiodiethanol | 1304.1 |
| VII | dimethylol propionic acid | 715.6 |
| VIII | deionized water | 328.4 |

[i]The diglycidyl ether of bisphenol A commercially available from Shell Chemical Company.
[ii]Propylene glycol monobutyl ether which is commercially available from Union Carbide.
[iii]Surfactant commercially available from Air Products.

Charges (I) and (II) were combined and heated to 107° C. and held at this temperature until (II) dissolved. Charge (III) was added, the mixture was held at a temperature of 107° C. to 110° C. for 15 minutes and then heated to 120° C. The reaction mixture was then heated to and held at a temperature of 160° C. to 170° C. for one hour and then charges (IV), (V), (VI), (VII) and (VIII) were added. The temperature was held at 70° C. to 75° C. until an acid value of less than 10 was obtained. The resultant vehicle (8158 grams) was reduced to 33.5 percent total solids by sequential additions of deionized water: 8158 grams, 4604 grams, 3646 grams and 2735 grams, respectively.

[c]This is microcrystalline silica and is commercially available from Illinois Minerals Co.
[d]Available from E. I. duPont de Nemours under the code R-900.

The grind paste was prepared by combining the ingredients together in the order listed and grinding the mixture in an open face sandmill to a Hegman grind of 7+ N. S.

The coating composition was prepared by combining the ingredients together with mild agitation.

The coating composition was cationically electrodeposited onto zinc phosphate treated cold rolled steel which is commercially available from Parker Chemical as BONDRITE 40. The bath temperature was 80° F. (27° C.), the bath pH was 4.54 and the bath conductivity was 760 micro mhos/cm². The composition was applied at a film thickness ranging from 0.90 to 0.93 mils at 400 volts for 2 minutes and heated in an electric oven according to the schedule set out below.

The pencil hardness was determined initially after baking as well as after one drop of methyl ethyl ketone was placed on the cured film and allowed to stand for one minute. The films were also evaluated for solvent resistance. Solvent resistance was determined by the number of back and forth rubs (double rubs) with an acetone soaked cloth.

Pencil hardness is a measure of the coating's resistance to a pencil indentor. The scale is as follows beginning with 4B which indicates a soft coating and increasing to 10H which indicates a hard coating:

4B, 3B, 2B, B, HB, F, H, 2H, 3H, . . . up to 10H.

| Temperature | Minutes | Initial Hardness | Hardness After Solvent Drop | Solvent Resistance (acetone double rubs) |
|---|---|---|---|---|
| 325° F. (163° C.) | 20 | H | less than 4B | metal exposed after 2 double rubs |
| 350° F. (177° C.) | 20 | 2H | less than 4B | metal exposed after 4 double rubs |
| 375° F. (191° C.) | 20 | 2H | less than 4B | metal exposed after 25 double rubs |
| 400° F. (204° C.) | 20 | 2H | F | metal exposed after 50 double rubs |

Part B
Coating Composition with Catalyst

| Ingredients | Parts by Weight (grams) |
|---|---|
| acrylic derived sulfonium group containing resin[3] | 1221.80 |
| grind paste[4] | 248.86 |
| deionized water | 1029.34 |

[3]The acrylic derived sulfonium group containing resin composition having internal crosslinking moieties and containing dodecylbenzene sulfonic acid as acid catalyst was prepared from the following components: 2.90 percent VAZO 67, 1.25 percent SURFYNOL 104, these percentages based on the following acrylic component: 38.00 percent thiodiethanol, 11.50 percent styrene, 11.50 percent 2-ethylhexyl acrylate, 9.30 percent n-butoxymethylol acrylamide, 6.80 percent glycidyl methacrylate and 22.90 percent methyl methacrylate. The composition had a 26 percent resin solids content in the following solvent mixture: 0.84 percent xylene, 2.51 percent butanol, 1.39 percent lactic acid, 5.46 percent ethylene glycol monohexyl ether, 88.26 percent deionized water, 0.16 percent isopropanol and 0.12 percent ethylene glycol.
[4]The grind paste was that detailed above in footnote 2.

The coating composition was prepared by combining the ingredients together with mild agitation.

The coating composition was cationally electrodeposited onto a BONDERITE 40 type substrate. The bath temperature was 80° F. (27° C.), the bath pH was 4.74 and the bath conductivity was 725 micro mhos/cm². The composition was applied at a film thickness of from about 0.93 to about 0.95 mils at 250 volts for 2 minutes and heated in an electric oven according to the schedule set out below.

The films were evaluated for pencil hardness both initially and after solvent drop and also for solvent resistance as has been described in Part A.

| Temperature | Minutes | Initial Hardness | Hardness After Solvent Drop | Solvent Resistance (acetone double rubs) |
|---|---|---|---|---|
| 325° F. (163° C.) | 20 | 2H | less than 4B | metal exposed after 5 double rubs |
| 350° F. (177° C.) | 20 | 2H | less than 4B | metal exposed after 33 double rubs |
| 375° F. (191° C.) | 20 | 3H | 3B | film dulls after 100 |

| Temperature | Minutes | Initial Hardness | Hardness After Solvent Drop | Solvent Resistance (acetone double rubs) |
|---|---|---|---|---|
| 400° F. (204° C.) | 20 | 4H | 2B | double rubs film slightly dulled after 100 double rubs |

As the data above shows, coating compositions containing catalyst exhibited a higher degree of cure as demonstrated by the improvement in the films' solvent resistance.

EXAMPLE II

In this Example a pigmented coating composition was prepared with an epoxy derived sulfonium group containing resin, aminoplast crosslinking agent and catalyst, wherein the pigment grind paste was prepared utilising an amine salt containing grind vehicle.

| Ingredients | Parts by Weight (grams) |
|---|---|
| epoxy derived sulfonium group containing resin[5] | 2500.0 |
| HALLCOMID M-8-10[6] | 18.0 |
| grind paste[7] | 301.7 |
| deionized water | 780.3 |

[5]The epoxy derived sulfonium group containing resin was prepared in the following manner:

| Charge | Ingredients | Parts by Weight (grams) |
|---|---|---|
| I | EPON 828 | 677.3 |
| II | bisphenol A | 296.7 |
| III | ethyltriphenylphosphonium iodide | 0.97 |
| IV | DOWANOL PPH[e] | 354.7 |
| V | thiodiethanol | 116.0 |
| VI | dimethylolpropionic acid | 108.4 |
| VII | 12-hydroxystearic acid | 42.9 |
| VIII | deionized water | 30.6 |
| IX | crosslinking agent/catalyst[f] | 562.4 |
| X | SURFYNOL 104 | 8.9 |

[e]This is propylene glycol monophenyl ether which is commercially available from Dow Chemical Company.
[f]This mixture of crosslinking agent and blocked acid catalyst was prepared by combining 800.4 parts by weight of CYMEL 1156 (which is a butylated melamine formaldehyde condensate commercially available from American Cyanamid) and 46.0 parts by weight of a blocked acid catalyst which is detailed below in footnote [15].
The epoxy derived sulfonium group containing resin composition was prepared as has been detailed above in footnote [b] with the following exception. Prior to reducing the solids level, charges (IX) and (X) were added. The resultant composition (1900 grams) was reduced to a total solids content of 34 percent by sequential additions of deionized water: 912.2 grams, 624.9 grams and 919.8 grams, respectively.
[6]The dehydration product of $C_8$ to $C_{10}$ carboxylic acids with dimethyl amine which is commercially available from C. P. Hall Company.
[7]The grind paste was prepared in the following manner:

| Charge | Ingredients | Parts by Weight (grams) |
|---|---|---|
| I | amine salt resin[g] | 79.3 |
| II | ethylene glycol monobutyl ether | 12.7 |
| III | acetic acid | 0.8 |
|  | deionized water | 5.0 |
| IV | deionized water | 40.4 |
| V | R-900 titanium dioxide | 211.8 |

[g]This amine salt resin was prepared from 70.70 percent JEFFAMINE D-2000 (commercially available from Jefferson Chemical Company) and 29.30 percent of the diglycidyl ether of bisphenol A having an epoxy equivalent weight of about 500. The resin was prepared at 38 percent solids in a blend of 1.05 percent acetic acid, 8.82 percent ethylene glycol monobutyl ether and 89.63 percent deionized water.

Charge (I) was placed in a suitably equipped reactor vessel and (II) was added with slight agitation. Charge (III), which had been premixed, was added and the mixture agitated for 5 minutes. Charge (IV) was then added, the mixture agitated for 5 minutes followed by charge (V). The paste was ground in an open face sand mill to a Hegman grind of 7 using ceramic beads. The paste had a viscosity of 16,000 centipoise using a number 4 spindle at 6 RPM.

The coating composition was prepared by combining the ingredients with mild agitation. The coating composition was cationically electrodeposited onto calcium modified zinc phosphate treated cold rolled steel commercially available from Mangill Chemical, Inc. as METABOND-50.

The bath temperature was 85° F. (29° C.), the pH of the bath was 4.83 and the conductivity of the bath was 520 micro mhos/cm². The composition was applied at a film thickness of from about 1.1 mils to about 1.3 mils at 350 volts for 2 minutes and heated in an electric oven according to the following schedule.

| Temperature | Minutes | Initial Hardness | Hardness After Solvent Drop |
|---|---|---|---|
| 325° F. (163° C.) | 20 | 2H | less than 4B |
| 325° F. (163° C.) | 20 | 2H | less than 4B |
| 350° F. (177° C.) | 20 | 4H | 3H |
| 375° F. (191° C.) | 20 | 4H | 3H |

EXAMPLE III

In this example a coating composition was prepared utilizing an epoxy derived sulfonium group containing resin, aminoplast crosslinking agent and catalyst. This coating composition was prepared with a grind vehicle free of amine salt.

| Ingredients | Parts by Weight (grams) |
|---|---|
| epoxy derived sulfonium group containing resin[8] | 1138.7 |
| grind vehicle[9] | 305.1 |
| deionized water | 2156.2 |

[8]The epoxy derived sulfonium group containing resin composition containing catalyst and crosslinking agent was prepared in the following manner:

| Charge | Ingredients | Parts by Weight (grams) |
|---|---|---|
| I | EPON 828 | 677.3 |
| II | bisphenol A | 296.7 |
| III | ethyltriphenylphosphonium iodide | 0.97 |
| IV | EKTASOLVE EEH[h] | 249.50 |
| V | thiodiethanol | 244.2 |
| VI | dimethylolpropionic acid | 108.4 |
| VII | 12-hydroxystearic acid | 42.9 |
| VIII | deionized water | 30.6 |
| IX | blocked acid catalyst[j] | 439.5 |

| | | crosslinking agent[i] | |
|---|---|---|---|
| X | | SURFYNOL 104 | 8.3 |

[h]Ethylene glycol mono 2-ethylhexyl ether commercially available from Eastman Kodak.
[i]This mixture of crosslinking agent and catalyst was prepared in footnote [f], above.
This resin composition was prepared in the manner detailed above in footnote [b] with the following exception: Prior to reducing the solids level, charges (IX) and (X) were added. The resultant composition (1800 grams) was thinned to 28.4 percent total solids by sequential additions of deionized water: 792 grams, 576 grams, 848 grams and 736 grams, respectively.
[g]This grind vehicle was prepared by combining together the following ingredients, blending for 5 minutes, and then grinding in an open face sand mill to a number 7+ Hegman grind using ceramic beads.

| Ingredients | Parts by Weight (grams) |
|---|---|
| epoxy resin[j] | 69.64 |
| deionized water | 79.06 |
| R-900 titanium dioxide | 206.30 |

[j]This sulfonium group containing epoxy resin was prepared from 67.19 percent epoxy resin prepared with EPON 828 and bisphenol A; 32.81 percent thiodiethanol and 0.05 percent ethyltriphenyl-phosphonium iodide (based on solids). The resin was prepared at 56 percent solids in a blend of 74.75 percent ethylene glycol monobutyl ether, 19.43 percent lactic acid and 5.82 percent deionized water.
The resultant vehicle had a viscosity of 52,000 centipoises at 6 RPM using a number 4 spindle.

The coating composition was prepared by combining the ingredients with mild agitation. The coating composition was cationically electrodeposited onto zinc phosphate treated cold rolled steel commercially available from Parker Chemical Company as EP-2.

The bath temperature was 80° F. (29° C.), the pH of the bath was 5.79 and the conductivity of the bath was 590 micro mhos/cm$^2$. The composition was applied at a thickness ranging from about 0.70 mils to about 0.85 mils at 300 volts for 90 seconds and heated in an electric oven according to the following schedule:

| Temperature | Minutes | Initial Hardness | Hardness After Solvent Drop | Solvent Resistance (acetone double rubs) |
|---|---|---|---|---|
| 300° F. (149° C.) | 20 | 6H | less than 4B | film slightly dulled after 100 double rubs |
| 325° F. (163° C.) | 20 | 7H | 7H | film not affected after 100 double rubs |
| 350° F( 177° C.) | 20 | 7H | 7H | film not affected after 100 double rubs |
| 375° F. (191° C.) | 20 | 7H | 7H | film not affected after 100 double rubs |

As is shown by the data above, the coating composition free of amine salt gave better film properties than that with amine salt. This is demonstrated by the fact that there was essentially no change in hardness after the solvent drop test.

EXAMPLE IV

This example is similar to Example III except that the coating composition was formulated without catalyst.

| Ingredients | Parts by Weight (grams) |
|---|---|
| epoxy derived sulfonium group containing resin[10] | 940.1 |
| grind vehicle[11] | 305.1 |
| deionized water | 2354.8 |

[10]The epoxy derived sulfonium group containing resin composition contained no catalyst and was prepared in the following manner:

| Charge | Ingredients | Parts by Weight (grams) |
|---|---|---|
| I | EPON 828 | 677.30 |
| II | bisphenol A | 296.70 |
| III | ethyltriphenylphosphonium iodide | 0.97 |
| IV | EKTASOLVE EEH | 249.50 |
| V | thiodiethanol | 244.20 |
| VI | dimethylolpropionic acid | 108.40 |
| VII | 12-hydroxy stearic acid | 42.90 |
| VIII | deionized water | 30.60 |
| IX | crosslinking agent[k] | 415.80 |
| X | SURYNOL 104 | 8.30 |

[k]CYMEL 1156 which is a butylated melamine formaldehyde condensate commercially available from American Cyanamid. The epoxy derived sulfonium group containing resin was prepared in the manner detailed above in footnote [b] except that after charges (VI), (VII) and (VIII) were added the reaction mixture was held at a temperature of 70° C. to 75° C. until an acid value less than 5 was obtained. Also, prior to reducing the solids level, charges (IX) and (X) were added. The resultant composition (1700 grams) was thinned to a total solids level of 34.4 percent by sequential additions of deionized water: 779 grams, 551 grams and 810 grams, respectively.
[11]The grind vehicle is the same as that detailed in footnote [9], above.

The coating composition was prepared by combining the ingredients together with mild agitation. The coating composition was cationically electrodeposited onto an EP-2 type substrate.

The bath temperature was 80° F. (29° C.), the pH of the bath was 5.75 and the conductivity of the bath was 550 micro mhos/cm$^2$. The composition was applied at a thickness ranging from 0.75 to 0.80 mils at 300 volts for 90 seconds and heated in an electric oven according to the following schedule.

| Temperature | Minutes | Initial Hardness | Hardness After Solvent Drop | Solvent Resistance (acetone double rubs) |
|---|---|---|---|---|
| 325° F. (163° C.) | 20 | 2H | less than 4B | metal exposed after 10 double rubs |
| 350° F. (177° C.) | 20 | 5H | less than 4B | metal exposed after 50 double |

| Temperature | Minutes | Initial Hardness | Hardness After Solvent Drop | Solvent Resistance (acetone double rubs) |
|---|---|---|---|---|
| 375° F. (191° C.) | 20 | 7H | less than 4B | rubs film not affected after 100 double rubs |
| 400° F. (204° C.) | 20 | 7H | less than 4B | film not affected after 100 double rubs |
| 425° F. (218° C.) | 20 | 7H | 2H | film not affected after 100 double rubs |

EXAMPLE V

In this example a pigmented coating composition was prepared with an epoxy derived sulfonium group containing resin, aminoplast crosslinking agent and catalyst.

| Ingredients | Parts by Weight (grams) |
|---|---|
| epoxy derived sulfonium group containing resin[12] | 963.4 |
| HALLCOMID M-8-10 | 18.0 |
| grind paste[13] | 291.2 |
| deionized water | 2327.4 |

[12]This resin has been detailed above in footnote (5)
[13]This grind paste utilizing an epoxy derived sulfonium group, containing resin as a vehicle was prepared in the following manner:

| Ingredients | Parts by Weight (grams) |
|---|---|
| epoxy derived sulfonium resin[1] | 313.0 |
| ethylene glycol monobutyl ether | 187.0 |
| deionized water | 735.3 |
| R-900 titanium dioxide | 2000.0 |

[1]This paste vehicle was prepared in the following manner:

| Charge | Ingredients | Parts by Weight (grams) |
|---|---|---|
| I | DER 736[m] | 509.00 |
| II | bisphenol A | 258.80 |
| III | EPON 1031[n] | 36.50 |
| IV | ethyltriphenylphosphonium iodide | 0.97 |
| V | ethylene glycol monobutyl ether | 315.7 |
| VI | thiodiethanol | 122.1 |
| VII | lactic acid (88 percent) | 51.0 |
| VIII | deionized water | 15.3 |

[m]This is the diglycidyl ether of propylene glycol having an epoxy equivalent weight of about 175 to 205 and available from Dow Chemical Company
[n]This is the polyglycidyl ether of tetraphenylene ethane having an epoxy equivalent weight of about 210 to 240 and available from Shell Chemical Company The paste vehicle was prepared in the manner detailed above in footnote (b) except that no reduction in solids was performed. The vehicle had a total solids content of 63.9 percent and an acid value of 1.5.

The coating composition was prepared by combining the ingredients together with agitation. The coating composition was cationically electrodeposited onto a METABOND-50 type substrate. The bath temperature was 85° F., the bath pH was 5.1 and the bath conductivity was 460 micro mhos/cm². The composition was applied at a thickness ranging from 1.4 to 1.6 mils at 350 volts for 2 minutes and heated in an electric oven according to the following schedule:

| Temperature | Minutes | Initial Hardness | Hardness After Solvent Drop |
|---|---|---|---|
| 325° F. (163° C.) | 20 | 3H | F |
| 350° F. (177° C.) | 20 | 4H | 4H |

EXAMPLE VI

In this example a pigmented coating composition was prepared with an acrylic based grind vehicle and a sulfonium group containing resin derived from an epoxy functional acrylic, aminoplast crosslinking agent and catalyst.

| Ingredients | Parts by Weight (grams) |
|---|---|
| CYMEL 1156[14] | 92.90 |
| catalyst[15] | 1.60 |
| ethylene glycol monohexyl ether | 40.40 |
| acrylic vehicle[16] | 491.32 |
| grind paste[17] | 296.30 |
| deionized water | 3580.80 |

[14]This methylated butylated melamine formaldehyde condensate is commercially available from American Cyanamid.
[15]This blocked acid catalyst was prepared in the following manner:

| Charge | Ingredients | Parts by Weight (grams) |
|---|---|---|
| I | ERL 4221[o] | 1168.0 |
|  | xylene | 704.7 |
| II | para-toluenesulfonic acid | 550.4 |
|  | DOWANOL PM acetate[p] | 660.5 |
| III | dibutyltin dilaurate | 1.7 |
|  | xylene | 10.0 |
| IV | phenyl isocyanate | 342.7 |
|  | xylene | 10.0 |

[o]This is 3,4-epoxycyclohexylmethyl-3,4-epoxycyclohexane carboxylate and it is commercially available from Union Carbide.
[p]This is propylene glycol monomethyl ether acetate available from Dow Chemical Company.

A reactor vessel equipped with thermometer and nitrogen inlet tube was charged with (I) and cooled to 20° C. Charge (II) was added over a 2 to 3 hour period at a temperature of 15° C. to 20° C. The reaction mixture was held at this temperature until an acid value of less than 15 was achieved. The reaction mixture was warmed to 55° C. and then charge (III) was added. Charge (IV) was added over a one hour period and the reaction mixture held at 55° C. until the isocyanate was completely reacted as indicated by infrared spectroscopy. The reaction mixture was cooled to room temperature. The resultant material had an acid value of 1.4 and an epoxy equivalent weight of 18.30.

[16]This epoxy derived sulfonium group containing acrylic grind vehicle was prepared in the following manner:

Parts by Weight

-continued

| Charge | Ingredients | (grams) |
|---|---|---|
| I | epoxy group containing acrylic resin[9] | 1767.5 |
| II | thiodiethanol | 119.9 |
|  | lactic acid | 100.2 |
|  | deionized water | 49.0 |

[9]This epoxy group containing acrylic resin was prepared in the following manner:

| Charge | Ingredients | Parts by Weight (grams) |
|---|---|---|
| I | DOWANOL PPH | 600.6 |
|  | deionized water | 70.4 |
| II | methyl methacrylate | 1787.5 |
|  | ethyl acrylate | 1457.5 |
|  | hydroxypropyl methacrylate | 825.0 |
|  | styrene | 825.0 |
|  | glycidyl methacrylate | 605.0 |
|  | tertiary dodecyl mercaptan | 165.0 |
|  | VAZO-67 | 132.0 |
|  | DOWNANOL PPH | 660.0 |
| III | VAZO-67 | 33.0 |
|  | DOWANOL PPH | 110.0 |

A suitably equipped reactor vessel was charged with (I) and about ten percent of charge (II), approximately 646 grams, and heated to reflux. The remainder of charge (II) was then added over 2 hours and 30 minutes followed by a one hour holding period. Subsequently, charge (III) was added in two equal portions, with a one hour holding period after addition of the first portion and a two hour holding period after the addition of the second portion. Finally the reactor vessel was equipped for distillation and the reaction mixture distilled to remove unreacted monomers. The distillation was carried out over about a two hour period at a temperature from 125° C. to 150° C. The resin product had an epoxy equivalent weight of 2038 and a total solids content of 78 percent determined at 150° C. for one hour. The grind vehicle was prepared by charging a suitably equipped reactor vessel with (I) and adding charge (II) at a temperature between 50° C. and 65° C. for ten hours. The resultant product was cooled to room temperature.

[17]The grind paste was prepared in the following manner:

| Ingredients | Parts by Weight (grams) |
|---|---|
| epoxy resin[r] | 573.50 |
| deionized water | 359.50 |
| black pigment | 9.09 |
| yellow iron oxide | 137.20 |
| red iron oxide | 20.20 |
| aluminum silicate | 265.40 |
| R-900 titanium dioxide | 1129.1 |
| deionized water | 400.0 |

[r]This sulfonium group containing epoxy resin was prepared as detailed below:

| Charge | Ingredients | Parts by Weight (grams) |
|---|---|---|
| I | EPON 828 | 1293.2 |
| II | bisphenol A | 398.6 |
| III | ethyltriphenyl phosphonium iodide | 1.7 |
| IV | ethylene glycol monobutyl ether | 531.6 |
| V | thiodiethanol | 826.3 |
| VI | lactic acid (88 percent) | 345.1 |
| VII | deionized water | 180.5 |

A suitably equipped reactor vessel was charged with (I) and (II) heated to 107° C. and held at this temperature until (II) dissolved. Charge (III) was added and the mixture held for 15 minutes at the same temperature. The mixture was then heated to 125° C. and held at a temperature of 160° C. to 170° C. for one hour with peak exotherm at 172° C. Subsequently (IV) was added and the mixture cooled to 75° C. Then charges (V), (VI) and (VII) were added and the reaction mixture held at 70° C. to 75° C. until an acid value of 1.9 was achieved. The resin had a solids content of 68.7 percent.

The ingredients were combined in the order listed above and ground in an open face sand mill until a Hegman grind of 7+ was achieved.

The coating composition was prepared by combining the first four ingredients and dispersing them into the deionized water. Finally the grind paste was added. The coating composition was cationically electrodeposited onto a BONDERITE 40 type substrate. The bath temperature was 70° F. (21° C.), the pH of the bath was 4.17 and the conductivity of the bath was 500 micro mhos/cm². The composition was applied at a film thickness of 0.90 mils at 250 volts for 2 minutes and heated in an electric oven at 350° F. (177° C.) for 20 minutes. The film had an initial hardness of 3H and a hardness of 3H after a drop of methyl ethyl ketone was placed on the film for one minute.

EXAMPLE VII

In this example two coating compositions were prepared for comparison. In part A, one coating composition was prepared utilizing an epoxy derived sulfonium group containing resin having internal crosslinking moieties and with catalyst. In part B, a second coating composition was prepared utilizing an epoxy derived amine group containing resin having internal crosslinking moieties and with catalyst. The cured coating compositions were evaluated for physical properties as has been described in the previous examples.

Part A
Coating composition prepared
from epoxy derived sulfonium
group containing resin

| Ingredients | Parts by Weight (grams) |
|---|---|
| epoxy derived sulfonium group containing resin[18] | 1000 |
| deionized water | 1000 |

[18]The epoxy derived sulfonium group containing resin composition having internal crosslinking moieties and containing dodecyl benzene sulfonic acid as acid catalyst was prepared in the following manner:

| Charge | Ingredients | Parts by Weight (grams) |
|---|---|---|
| I | ethylene glycol monohexyl ether | 131.10 |
|  | ethylene glycol monobutyl ether | 32.70 |
|  | methyl isobutyl ketone | 161.25 |
|  | deionized water | 19.20 |
| II | styrene | 277.50 |
|  | 2-ethylhexyl acrylate | 277.50 |
|  | methyl methacrylate | 577.50 |
|  | N—butoxymethylol acrylamide | 365.85 |
|  | glycidyl methacrylate | 142.50 |
|  | ethylene glycol monohexyl ether | 144.00 |
|  | ethylene glycol monobutyl ether | 36.00 |
|  | VAZO-67 | 75.00 |
| III | ethylene glycol monohexyl ether | 24.00 |
|  | ethylene glycol monobutyl ether | 6.00 |
|  | VAZO-67 | 13.50 |
| IV | deionized water | 150.00 |
| V | thiodiethanol | 347.70 |
|  | lactic acid | 77.70 |
|  | deionized water | 342.00 |
| VI | dodecylbenzene sulfonic acid | 7.00 |
|  | SURFYNOL 104 | 27.65 |

A suitably equipped reactor vessel was charged with (I) and heated to reflux. Charge (II) was added dropwise over about a three hour period and then held at reflux temperature for one hour. One half of charge (III) was added and the reaction mixture held at reflux for one hour followed by addition of the other half of the charge and another one hour hold. Subsequently, the vessel was equipped for distillation and the mixture distilled (charge (IV) was added dropwise during distillation). After distillation was complete the reaction mixture was cooled to 85° C. and held at this temperature for 7 hours. Subsequently charge (VI) was added.

The coating composition was prepared by combining the ingredients with mild agitation.

The coating composition was ctionically electrodeposited onto a BONDERITE 40 type substrate. The bath temperature was 80° F. (27° C.), the bath conductivity was 540 micro mhos/cm$^2$ and the bath pH was 4.37. The coating composition was applied at a film thickness of from 0.88 mil to 0.93 mil at 100 volts for 2.5 minutes and heated in an electric oven according to the following schedule.

| Temperature | Minutes | Initial Hardness | Hardness After Solvent Drop | Solvent Resistance (acetone double rubs) | Film Appearance |
|---|---|---|---|---|---|
| 325° F. (163° C.) | 20 | H | 4B | metal exposed after 6 rubs | clear |
| 350° F. (177° C.) | 20 | 2H | 4B | metal exposed after 7 rubs | clear |
| 375° F. (191° C.) | 20 | 2H | less than 4B | metal exposed after 8 rubs* | very slight yellowing |
| 400° F. (204° C.) | 20 | 2H | less than 4B | metal exposed after 9 rubs* | very slight yellowing |

*slightly scratched surface

Part B
Coating composition prepared from epoxy derived amine group containing resin

| Ingredients | Parts by Weight (grams) |
|---|---|
| epoxy derived amine group containing resin[19] | 1000 |
| deionized water | 1000 |

[19]The epoxy derived amine group containing resin composition having internal crosslinking moieties and containing dodecyl benzene sulfonic acid as acid catalyst was prepared in the following manner:

| Charge | Ingredients | Parts by Weight (grams) |
|---|---|---|
| I | ethylene glycol monohexyl ether | 84.70 |
| | ethylene glycol monobutyl ether | 21.80 |
| | methyl isobutyl ketone | 107.50 |
| | deionized water | 12.80 |
| II | styrene | 185.00 |
| | 2-ethylhexyl acrylate | 185.00 |
| | methyl methacrylate | 385.00 |
| | N—butoxymethylol acrylamide | 243.90 |
| | glycidyl methacrylate | 95.00 |
| | ethylene glycol monohexyl ether | 96.00 |
| | ethylene glycol monobutyl ether | 24.00 |
| | VAZO-67 | 50.00 |
| III | ethylene glycol monohexyl ether | 16.00 |
| | ethylene glycol monobutyl ether | 4.00 |
| | VAZO-67 | 6.00 |
| IV | deionized water | 100.00 |
| V | diethanol amine | 67.92 |
| VI | SURFYNOL 104 | 18.40 |
| VII | dodecylbenzene sulfonic acid | 19.70 |

A suitably equipped reactor vessel was charged with (I) and heated to reflux. Charge (II) was added dropwise over about a three hour period and held at reflux for one hour. One-half of charge (III) was added and the reaction mixture was held at reflux for one hour followed by addition of the other half of the charge and another one hour hold. Subsequently the vessel was equipped for distillation and the mixture distilled (charge (IV) was added dropwise during the distillation) and cooled to ambient temperature. The reaction mixture was heated to 110° C. and charge (V) was added followed by a 3 hour hold at 105° C. to 110° C. The reaction mixture was then cooled to 95° C. and charges (VI) and (VII) added. The resin was then diluted with water containing lactic acid to a final solids of 20 percent. The lactic acid content was such as to neutralize all of the diethanol amine in the resin above.

The coating composition was prepared by combining the ingredients together with mild agitation.

The coating composition was cationically electrodeposited onto a BONDERITE 40 type substrate. The bath conductivity was 700 micro mhos/cm$^2$ and the bath pH was 4.66. The composition was applied at a film thickness of 0.76 mil to 0.90 mil at 50 volts for 2.5 minutes and heated in an electric oven according to the following schedule.

| Temperature | Minutes | Initial Hardness | Hardness After Solvent Drop | Solvent Resistance (acetone double rubs) | Film Appearance |
|---|---|---|---|---|---|
| 325° F. (163° C.) | 20 | 2H | less than 4B | metal exposed after 15 rubs | slight yellowing of film |
| 350° F. (177° C.) | 20 | 3H | less than 4B | metal exposed after 17 rubs | film yellowed |
| 375° F. (191° C.) | 20 | 3H | less than 4B* | metal exposed after 18 rubs | film is hazy and yellow |
| 400° F. (204° C.) | 20 | 2H | less than 4B | metal exposed after 23 rubs* | very heavy yellowing |

*slightly scratched surface

As is demonstrated by the data above the amine group containing resin, i.e., nitrogen base containing resin, resulted in films exhibiting severe yellowing whereas the sulfonium group containing resin resulted in films which were, for the most part, clear or only slightly yellowed.

It should be pointed out that the better solvent-rub resistance for the amine containing system of Part B versus the all sulfonium group containing system of Part A is believed to be due to a higher catalyst level in the diethanol amine solubilized resin of Part B. The Part B composition had about 1.7 percent dodecylbenzene sulfonic acid catalyst added on acrylic monomer solids while the Part A composition had only 0.4 percent dodecylbenzene sulfonic acid catalyst added an acrylic monomer solids. It is believed that a level of catalyst in the Part A composition equal to the level of catalyst in the Part B composition would significantly improve its solvent rub resistance. However, the purpose of this Example was to demonstrate the reduced yellowing of the coating compositions of the present invention which are based on sulfonium or phosphonium group containing resins compared to compositions based on amine group containing resins.

What is claimed is:

1. An aqueous, cationically electrodepositable coating composition, comprising a ternary sulfonium or quaternary phosphonium group containing resin, an aminoplast or phenoplast crosslinking agent and a catalytic amount of a non-ionic ester of a sulfonic acid as latent acid catalyst to catalyze the reaction between the sulfonium or phosphonium group containing resin and the aminoplast or phenoplast crosslinking agent.

2. The coating composition of claim 1 wherein the resinous component of the coating composition is essentially free of basic nitrogen containing groups.

3. The coating composition of claim 1 wherein the crosslinking agent is an aminoplast resin.

4. The coating composition of claim 1 wherein the latent acid catalyst is represented by either of the following structural formulas:

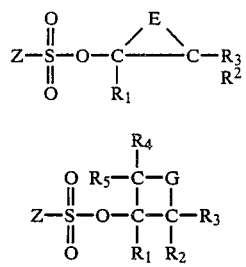

wherein:

Z is a radical selected from the group consisting of amino and an organic radical, said organic radical being connected to the sulfur atom by a carbon atom;

E is $C_1$–$C_{18}$ alkylene, $C_2$–$C_{18}$ alkenylene;

G is $C_1$–$C_{18}$ alkylene, $C_1$–$C_{18}$ hydroxyl substituted alkylene, $C_2$–$C_{18}$ alkenylene, $C_2$–$C_{18}$ hydroxyl substituted alkenylene; and $R_1$, $R_2$, $R_3$, $R_4$, $R_5$ are independently hydrogen or organic radical.

5. The coating composition of claim 1 wherein the latent acid catalyst is represented by the following structural formula:

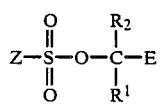

wherein:

Z is a radical selected from the group consisting of amino and an organic radical, said organic radical being connected to the sulfur atom by a carbon atom;

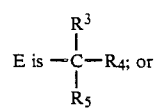

$C_3$–$C_{20}$ cycloalkyl; and $R_1$ is hydrogen, carboalkoxy, $C_3$–$C_{20}$ alkyl, $C_6$–$C_{18}$ aryl, or $C_3$–$C_{20}$ cycloalkyl;

$R_2$ is hydrogen, carboalkoxy, $C_3$–$C_{20}$ alkyl, $C_6$–$C_{18}$ aryl, or $C_3$–$C_2$ cycloalkyl;

$R_3$ is hydrogen, carboalkoxy, acyloxy, N-alkylcarbamyloxy, N-arylcarbamyloxy, $C_3$–$C_{20}$ alkyl, $C_6$–$C_{18}$ aryl, or $C_3$–$C_{20}$ cycloalkyl;

$R_4$ is hydrogen, carboalkoxy, acyloxy, N-alkylcarbamyloxy, N-arylcarbamyloxy, $C_3$–$C_{20}$ alkyl, $C_6$–$C_{18}$ aryl, or $C_3$–$C_{20}$ cycloalkyl; and $R_5$ is hydrogen, carboalkoxy, acyloxy, N-alkylcarbamyloxy, N-arylcarbamyloxy, $C_3$–$C_{20}$ alkyl, $C_6$–$C_{18}$ aryl, or $C_3$–$C_{20}$ cycloalkyl.

6. The coating composition of claim 4 wherein the latent acid catalyst is cyclohexyl tosylate.

7. The coating composition of claim 5 wherein the latent acid catalyst is 2,2,4-trimethyl-1,3,pentanediyl dimethanesulfonate.

8. The coating composition of claim 1 wherein the latent acid catalyst is a non-ionic, saturated or unsaturated organic polycyclic ester of a sulfonic acid.

9. The coating composition of claim 1 wherein the catalyst is present in an amount ranging from about 0.1 percent by weight to about 10 percent by weight, the percentages by weight being based on the total weight of the composition.

10. The coating composition of claim 1 wherein the sulfonium or phosphonium group containing resin is present in an amount ranging from about 40 percent by weight to about 95 percent by weight and the aminoplast or phenoplast crosslinking agent is present in an amount ranging from about 5 percent by weight to about 60 percent by weight, the percentages being based on the total weight of the sulfonium or phosphonium group containing resin and crosslinking agent.

11. The coating composition of claim 3 wherein the aminoplast resin is a melamine formaldehyde condensation product.

12. An aqueous, cationically electrodepositable coating composition, comprising a ternary sulfonium or quaternary phosphonium group containing resin, an aminoplast or phenoplast crosslinking agent, and a catalytic amount of dodecylbenzene sulfonic acid to catalyze the reaction between the sulfonium and phosphonium group containing resin and the aminoplast or phenoplast crosslinking agent.

13. An aqueous, cationically electrodepositable coating composition, comprising a ternary sulfonium or quaternary phosphonium group containing resin, an aminoplast or phenoplast crosslinking agent, and a catalytic amount of dinonylnaphthalene sulfonic or disulfonic acid to catalyze the reaction between the sulfonium and phosphonium group containing resin and the aminoplast or phenoplast crosslinking agent.

14. The coating composition of claim 1 wherein the catalyst is an ester formed by reacting an oxirane containing material having at least two oxirane groups per molecule with a sulfonic acid and then blocking the beta hydroxyl group formed with a monoisocyanate.

15. The coating composition of claim 14 wherein the ester is formed from a cycloaliphatic polyepoxide and paratoluene sulfonic acid and the beta-hydroxyl group is blocked with phenyl isocyanate.

16. The coating composition of claim 1 wherein the polyepoxide is 3,4-epoxycyclohexylmethyl 3,4-epoxyhexane carboxylate.

17. A method of electrocoating an electrically conductive surface serving as a cathode comprising passing an electric current between said cathode and an anode in electrical contact with an aqueous cationically electrodepositable coating composition, comprising a ternary sulfonium or quaternary phosphonium group containing resin, an aminoplast or phenoplast crosslinking agent and a catalytic amount of a non-ionic ester of a sulfonic acid as latent acid catalyst to catalyze the reaction between the sulfonium or phosphonium group containing resin and the aminoplast or phenoplast crosslinking agent.

18. The method of claim 17 wherein the resinous component of the coating composition is essentially free of basic nitrogen-containing groups.

19. The method of claim 17 wherein the crosslinking agent of the coating composition is an aminoplast resin.

20. The method of claim 19 wherein the catalyst is present in the coting composition in an amount ranging from about 0.1 percent by weight to about 10 percent by weight, the percentages being based on the total weight of the coating composition.

21. The method of claim 17 wherein the sulfonium or phosphonium group containing resin is present in the coating composition in an amount ranging from about 40 percent by weight to about 95 percent by weight and the aminpolast or phenoplast crosslinking agent is present in an amount ranging from about 5 percent by weight to about 60 percent by weight, the percentages being based on the total weight of the sulfonium or phosphonium group containing resin and crosslinking agent.

* * * * *

UNITED STATES PATENT AND TRADEMARK OFFICE
CERTIFICATE OF CORRECTION

PATENT NO. : 4,812,215

DATED : March 14, 1989

INVENTOR(S) : Robert F. Karabin, Ken W. Neiderst, Michael G. Sandala and Edward R. Coleridge It is certified that error appears in the above-identified patent and that said Letters Patent is hereby corrected as shown below:

Title page:

In the References Cited, Column 1, the reference 4,119,599 was listed incorrectly, it should read 4,911,599.

Signed and Sealed this

Second Day of October, 1990

Attest:

HARRY F. MANBECK, JR.

*Attesting Officer*            *Commissioner of Patents and Trademarks*